Feb. 9, 1965 T. K. KJELLMAN ETAL 3,169,181

TEMPERATURE AND HUMIDITY RESPONSIVE DEVICE
HAVING HIGH SWITCHING LOAD CAPACITY

Filed Dec. 8, 1961 2 Sheets-Sheet 1

THOMAS K. KJELLMAN
FRANK O. WATSON
INVENTORS

BY

Killman, Smith & Lamb
ATTORNEYS

THOMAS K. KJELLMAN
FRANK O. WATSON
INVENTORS

BY

Killman, Smith & Lamb
ATTORNEYS

United States Patent Office 3,169,181
Patented Feb. 9, 1965

3,169,181
TEMPERATURE AND HUMIDITY RESPONSIVE DEVICE HAVING HIGH SWITCHING LOAD CAPACITY

Thomas K. Kjellman, Timonium, and Frank O. Watson, Baltimore, Md., assignors to The Bendix Corporation, Baltimore, Md., a corporation of Delaware
Filed Dec. 8, 1961, Ser. No. 158,060
15 Claims. (Cl. 200—138)

This invention relates to a temperature and humidity responsive switching device having particular advantages as to physical size and cost of production.

There have been many instruments available which are capable of accurately measuring ambient temperature and humidity conditions and operating switches but, in general, these have been relatively large and costly if they were required to switch any considerable amount of electrical power. A highly competitive market places great emphasis on low cost and small size coupled with reasonable reliability in service. In modern home air conditioning systems it is frequently necessary to switch a load of up to twelve amperes by means of a switching device which is as small and light as possible. Consequently, it is quite common for small welds to be produced between the switch contacts which drastically increase the deadband of the system and shorten the useful life of the contacts. Recent designs have recognized that high humidity conditions occasionally occur at comparatively low temperatures which makes it desirable that the air conditioning system include provisions for removing moisture without also cooling the air. Systems incorporating this feature usually have a pair of cooling coils in series, a condenser, a compressor, and a transfer or reheat valve, normally solenoid operated, which causes warm refrigerant to be circulated through the second of these coils such that the dehumidified air from the first coil is again reheated to approximately room temperature. When it is desired to cool the air, the transfer valve is moved to a new position such that both of the cooling coils receive cold refrigerant and the warm refrigerant flows only to the condenser and compressor. This requires a switching device which typically will operate the compressor if the temperature sensor is not satisfied and/or if the humidity sensor is not satisfied, and will operate the reheat valve if the temperature sensor is satisfied and the humidity sensor is not.

It is, therefore, an object of the present invention to provide a temperature and humidity operated switching device having electrical switching capacity capable of switching very substantial electrical loads such as those found in the largest window type air conditioners available.

It is another object to provide a switching device meeting the above objective and which can be manufactured in a package of minimum size.

It is a further object to provide a switching device meeting the above objectives and which can be easily and conveniently mass produced.

It is a further object of the present invention to provide a switching device meeting the above objectives and which can be produced at a very competitive price.

Other objects and advantages will become apparent from the following specification taken in connection with the accompanying drawings, in which.

Figure 1:
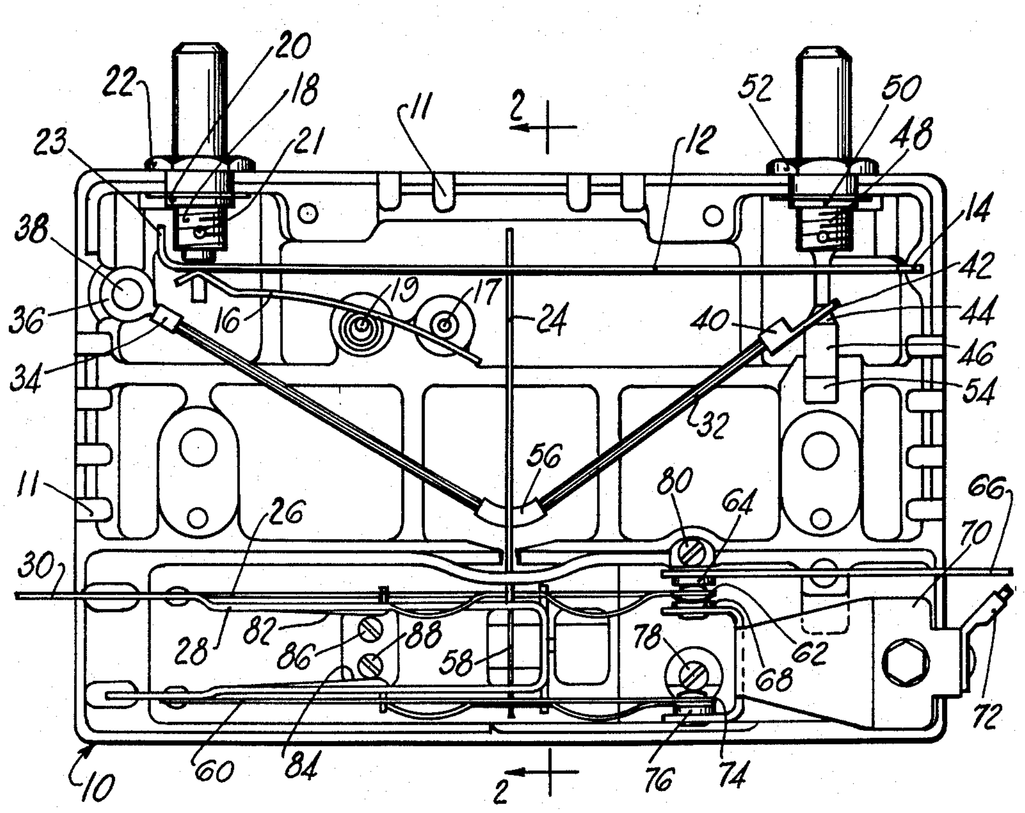
FIG. 1 is a plan view of a temperature and humidity responsive device incorporating our invention.
Figure 2:
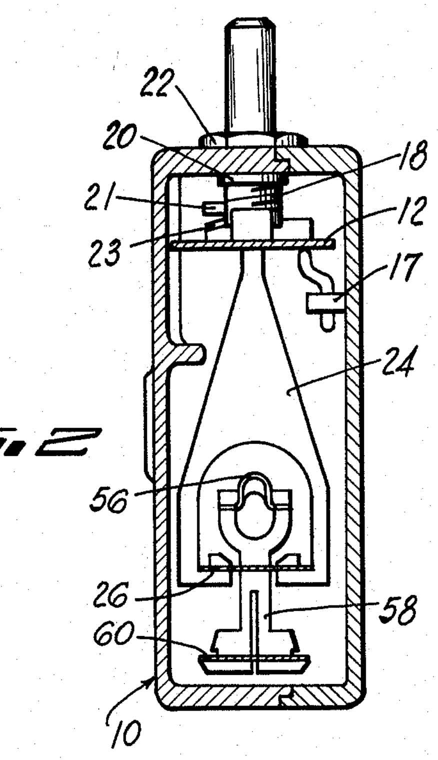
FIG. 2 is a sectional view of the device of FIG. 1 taken on line 2—2.

Referring now to FIG. 1, which is drawn about two times normal scale, the switch device generally is housed in a case or housing 10 which, in this particular arrangement is normally fabricated of a plastic material having insulating electrical properties and which includes a number of perforations 11 to admit ambient air. The air temperature sensing member is a bimetal beam 12 supported at one end in a recess 14 in housing 10 and at the other end by means of a spring 16 carried on a pair of pins 17 and 19 which urges the beam 12 against an adjusting screw 18 threadedly engaged with a collar 20 fastened through a wall of housing 10 by means of a nut 22. A pin 21 on adjusting screw 18 is rotatable to strike against an inclined surface 23 on an upturned portion of beam 12. Changes in the position of beam 12 are transmitted through a link 24 of insulating material to a snap switch member 26 mounted on a metal bracket 28. A wiring terminal 30 extending through the wall of housing 10 is an extension of bracket 28.

The humidity responsive element 32 which in the present instance consists of a plurality of strands of hair, is anchored at one end by means of a retaining member 34 which includes a loop or ring 36 which hooks over a pin 38 attached to housing 10. At its opposite end hair member 32 is held by a retaining member 40 similar to that shown at numeral 36 which has its loop 42 carried on a tapered portion 44 of a cylindrical extension 46 of an adjusting screw 48. This adjusting screw is threadedly engaged with a collar 50 fastened to the wall of housing 10 by means of a nut 52. To avoid inaccuracies resulting from lateral movement of extension 46, it is retained in a guide 54 formed in housing 10. A saddle or tensioning device 56 positioned within a recess in link 24 is fastened through a link 58 to a snap switch member 60 mounted on bracket 28.

A contact 62 mounted on switch member 26 is movable when in one position to engage a contact 64 attached to a wiring connector 66 extending outside of housing 10 and when in its other position to engage a contact 68 forming part of a bimetallic support member 70 also having a wiring connector 72 for connection to a wire outside of housing 10. Switch member 60 includes a contact 74 which, when in one position, engages a contact 76 forming part of bimetallic member 70, and in its other position engages one adjusting screw 78 which is attached to housing 10 by an eccentric mounting which enables it to vary the effective travel of contact 74. A similar adjusting screw 80 adjusts contact 64 and therefore varies the travel of contact 62.

Bracket 28 carries a pair of cut out sections 82 and 84 which are bent slightly out of the plane of its arms and which contact a pair of eccentric adjusting screws 86 and 88, respectively, for the purpose of providing an adjustment of the operating force of the sensors connected to snap switch members 26 and 60.

Figure 3:
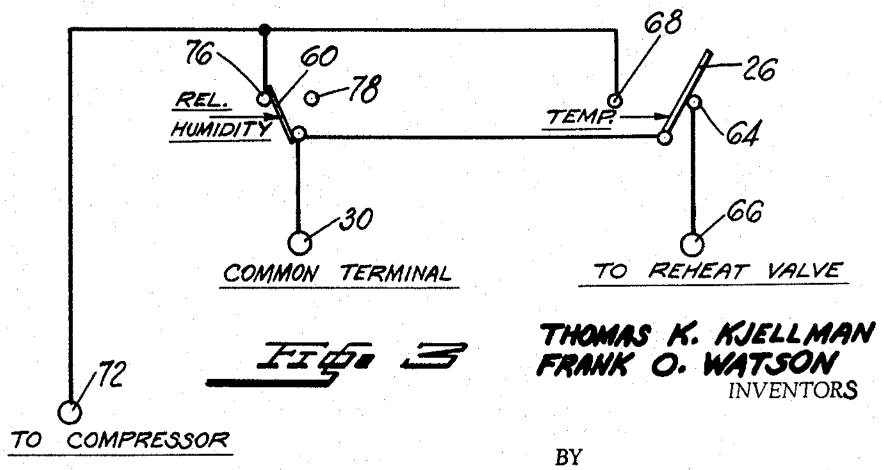
FIG. 3 is a schematic wiring diagram showing a typical switching arrangement possible with the device of FIGS. 1 and 2.

Operation of the device described herein may be best understood by considering it as a control for an air conditioning device of the type previously described, although it will be obvious that numerous switching arrangements and applications are possible. Referring now to FIG. 3, terminal 30 is the common terminal and would normally be connected to a source of power. With the switch members 26 and 60 in the positions shown it is clear that the temperature sensing beam 12 is sensing a temperature below that set on adjusting screw 18 inasmuch as switch 26 is connected to terminal 66 which operates the reheat valve. The relative humidity sensor 32, however, is responding to an excess of humidity and has caused switch 60 to move against contact 76. Power is thus connected to both the compressor and the reheat valve and this will cause the air conditioner to circulate warm coolant through the second of the two sets of cooling coils as previously described and thus dehumidifying but not cooling. Suppose now that the air becomes sufficiently dehumidified that the hair element 32 is shortened to move contact 60 against contact 78. This causes the power to the compressor to be interrupted and thus effectively shuts the air conditioner off, although the reheat valve is still energized. Should the air temperature now increase enough to move switch 26 against contact 68, the reheat valve is deenergized and the compressor is energized thus causing normal cooling and dehumidifying action. During any of these cycles when power is applied to the compressor, it will tend to draw a substantial current across contacts 62 and 68 or contacts 74 and 76. This occasionally causes small welds to be formed between these mating contacts but also causes the bimetallic support member 70 to be heated and thus moving the stationary contacts 68 and 76 in and out of the paper as viewed in the drawing and shearing the welds each time they are formed.

In addition to providing for an infinite variation in temperature reference, the adjusting screw 18 includes a pin 21 which is rotatable with said screw and which contacts the upturned lip and inclined surface 23 on the end of beam 12 when screw 18 is in its extreme limit of travel in one direction. This causes beam 12 to be deflected downward and positively connects switch contact 62 against contact 68, thus energizing the compressor.

While only one embodiment has been shown and described herein, modifications may be made without departing from the spirit and scope of the invention.

We claim:

1. A temperature and humidity responsive device comprising a housing;
- an elongated bimetallic element having one end supported in said housing;
- an adjusting screw attached to said housing accessible exteriorly thereof and extending within said housing;
- resilient means biasing said bimetallic element against said adjusting screw;
- an elongated humidity responsive element supported at one end by said housing;
- a second adjusting screw attached to said housing and accessible exteriorly thereof;
- supporting means carrying the opposite end of said humidity responsive element attached to said second adjusting screw for varying the tension on said humidity responsive element;
- a tensioning device located along said humidity responsive element between the ends thereof;
- a bracket of electrically conducting material located in said housing including a contact extending exteriorly of said housing;
- a link responsive to movement of said bimetallic element;
- a first snap switch member attached to said bracket responsive to movement of said link in response to temperature changes;
- a second snap switch member attached to said bracket responsive to movement of said tensioning device in response to changes in humidity;
- a support member of bimetallic material in said housing including a contact extending exteriorly thereof and first and second stationary switch members attached thereto engageable with said first and second snap switch members respectively, said support member being movable in response to temperature changes resulting from opening and closing of said switch members to cause said stationary switch members to move normally to the direction of said snap switch members thereby shearing any welds between said members;
- third and fourth stationary switch members arranged in cooperative relation with said first and second snap switch members, respectively, including adjustable eccentric means for varying the effective travel of said snap switch members;
- and adjustable eccentric means operatively connected to said bracket for varying the sensitivity of said snap switch members.

2. A temperature and humidity responsive switching device comprising:
- a housing;
- an elongated bimetallic element having one end supported in said housing;
- an adjusting screw attached to said housing accessible outside of said housing and abutting against the opposite end of said bimetallic element;
- an elongated humidity responsive element supported at one end by said housing and having a substantially inflexible loop member at its other end;
- a second adjusting screw attached to said housing and a shaft movable therewith including a small diameter portion, a larger diameter portion and a tapered section therebetween for carrying said loop and for varying the tension on said humidity responsive element;
- a tensioning device located between the ends of said humidity responsive element;
- a link movable in response to movement of said bimetallic element operative in substantially the same plane as said tensioning device;
- a first snap switch member responsive to movement of said link in response to temperature changes;
- a second snap switch member connected to said tensioning device and responsive to movement thereof in response to changes in humidity; and
- a support member of bimetallic material in said housing and at least one stationary switch member attached thereto engageable with at least one of said snap switch members, said support member being movable in response to temperature changes resulting from opening and closing of said switch members to cause said stationary switch member to move normal to the direction of said snap switch member thereby shearing any welds between said switch members.

3. A temperature and humidity responsive device as claimed in claim 2 wherein said bimetallic element and said first named adjusting device include cooperating means effective at one end of the travel of said adjusting means to close said first snap switch member against one of said stationary switch members.

4. A temperature and humidity responsive device comprising:
- a housing;
- an elongated bimetallic element having one end supported in said housing;
- an adjusting device attached to said housing accessible exteriorly of said housing and abutting against the opposite end of said bimetallic element;
- an elongated humidity responsive element supported at one end by said housing;
- a second adjusting device attached to said housing and supporting means operatively connected thereto carrying the opposite end of said humidity responsive element operable to vary the tension of said humidity responsive element;
- a tensioning device located between the ends of said humidity responsive element;
- a link movable in response to movement of said bimetallic element;
- a first snap switch member responsive to movement of said link in response to temperature changes;
- a second snap switch member responsive to movement of said tensioning device in response to changes in humidity; and
- support means in said housing and at least one stationary switch member attached thereto engageable with at least one of said snap switch members, said support means including bimetallic means movable in response to temperature changes resulting from opening and closing of said switch members to cause said stationary switch member to move in a plane normal to the direction of said snap switch member thereby shearing any welds between said switch members.

5. A temperature and humidity responsive device as claimed in claim 4 wherein said bimetallic element and said first named adjusting device include cooperating means effective at one end of the travel of said adjusting means to close said first snap switch member against one of said stationary switch members.

6. A temperature and humidity responsive switching device comprising:

a housing;

an elongated bimetallic element having one end supported in said housing;

an adjusting screw attached to said housing accessible outside of said housing and abutting against the opposite end of said bimetallic element;

an elongated humidity responsive element supported at one end by said housing and having a substantially inflexible loop member at its other end;

a second adjusting screw attached to said housing and a shaft movable therewith including a small diameter portion, a larger diameter portion and a tapered section therebetween for carrying said loop on the opposite end of said humidity responsive element and for varying the tension on said humidity responsive element;

a tenisoning device located between the ends of said humidity responsive element;

a link movable in response to movement of said bimetallic element operative in substantially the same plane as said tensioning device;

a first snap switch member responsive to movement of said link in response to temperature changes;

a second snap switch member connected to said tensioning device and responsive to movement thereof in response to changes in humidity;

a bracket of electrically conducting material carrying said snap switch members located in said housing including a contact extending exteriorly of said housing;

a support member of bimetalic material in said housing and at least one stationary switch member attached thereto engageable with at least one of said snap switch members, said support member being movable in response to temperature changes resulting from opening and closing of said switch members to cause said stationary switch member to move normal to the direction of said snap switch member thereby shearing any welds between said switch members;

at least one additional stationary switch member arranged in cooperative relation with at least one of said snap switch members including adjustable means for varying the effective travel of said snap switch member; and adjustable means operatively connected to said bracket for varying the sensitivity of at least one of said snap switch members.

7. A temperature and humidity responsive device as claimed in claim 6 wherein said bimetallic element and said first named adjusting device include cooperating means effective at one end of the travel of said adjusting means to close said first snap switch member against one of said stationary switch members.

8. A temperature and humidity responsive device comprising:

a housing;

a bimetallic element having one end supported in said housing;

an adjusting device attached to said housing accessible exteriorly of said housing and abutting against the opposite end of said bimetallic element;

a humidity responsive element in said housing;

a second adjusting device attached to said housing operatively connected to said humidity responsive element;

tensioning means attached to said humidity responsive element;

a link movable in response to movement of said bimetallic element operative in substantially the same plane as said tensioning means;

a first movable switch member responsive to movement of said link in response to temperature changes;

a second movable switch member responsive to movement of said tensioning device in response to changes in humidity; and support means in said housing and at least one stationary switch member attached thereto engageable with at least one of said movable switch members, said support means including bimetallic means movable in response to temperature changes resulting from opening and closing of said switch members to cause said stationary switch member to move in a plane normal to the direction of said movable switch member thereby shearing any welds between said switch members.

9. A temperature and humidity responsive device as claimed in claim 8 wherein said bimetallic element and said first named adjusting device include cooperating means effective at one end of the travel of said adjusting means to close said first snap switch member against one of said stationary switch members.

10. A temperature and humidity responsive device comprising:

a housing;

a bimetallic element having one end supported in said housing;

an adjusting device attached to said housing accessible exteriorly of said housing and operatively connected to said bimetallic element;

a humidity responsive element in said housing;

a second adjusting device attached to said housing and operatively connected to said humidity responsive element;

tensioning means attached to said humidity responsive element;

a link movable in response to movement of said bimetallic element operative in substantially the same plane as said tensioning means;

a first snap switch member responsive to movement of said link in response to temperature changes;

a second snap switch member responsive to movement of said tensioning device in response to changes in humidity; and a support means in said housing including at least one stationary switch member attached thereto engageable with at least one of said snap switch members.

11. A temperature and humidity responsive device as set forth in claim 10 wherein said support means includes condition responsive means operative in response to changes in said condition resulting from movement of said snap switch member for moving said stationary switch member in a plane normal to the direction of its corresponding snap switch member.

12. A temperature and humidity responsive device as set forth in claim 10 wherein adjustable means are provided attached to said housing for varying the switching characteristics of at least one of said snap switch members.

13. A temperature and humidity responsive device as set forth in claim 10 wherein are provided at least one additional stationary switch member arranged to cooperate with at least one of said snap switch members including adjustable means for varying the effective travel of said snap switch member, and additional adjustable means for varying the sensitivity of said snap switch member.

14. A temperature and humidity responsive switching device comprising:
a housing;
a bimetallic element supported in said housing;
an adjusting device attached to said housing and accessible outside of said housing abutting against said bimetallic element;
a humidity responsive element in said housing;
a second adjusting means operatively connected to said humidity responsive element;
tensioning means attached to said humidity responsive element;
a link movable in response to movement of said bimetallic element operative in substantially the same plane as said tensioning means;
a first movable switch member responsive to movement of said link;
a second movable switch member responsive to movement of said tensioning means;
and support means in said housing carrying a stationary switch member engageable with said movable switch members, said support means including bimetallic means movable in response to temperature changes resulting from opening and closing of said switch members to cause said stationary switch member to move in a plane normal to the direction of said movable switch members thereby shearing any welds between said switch members.

15. A temperature and humidity responsive switching device comprising:
a housing;

a temperature responsive device supported in said housing;
a humidity responsive element in said housing;
tensioning means attached to said humidity responsive element;
a link movable in response to movement of said temperature responsive device operative in substantially the same plane as said tensioning means;
a movable switch member responsive to movement of one of said link and tensioning means;
an adjusting device for varying the response of said movable switch members;
and a support means in said housing carrying a stationary switch member engageable with said movable switch member, said support means including bimetallic means movable in response to temperature changes resulting from opening and closing of said switch members to cause said stationary switch member to move in a plane normal to the direction of said movable switch member thereby shearing any welds between said switch members.

References Cited in the file of this patent

UNITED STATES PATENTS

| | | |
|---|---|---|
| 2,444,030 | Burch | June 29, 1948 |
| 2,716,682 | Franklin | Aug. 30, 1955 |

FOREIGN PATENTS

| | | |
|---|---|---|
| 721,435 | Great Britain | Jan. 5, 1955 |